United States Patent [19]

Hoeks et al.

[11] Patent Number: 5,166,249
[45] Date of Patent: Nov. 24, 1992

[54] POLYMER MIXTURE WHICH COMPRISES POLYPHENYLENE ETHER, POLYOCTENYLENE AND TIO$_2$ OR BASO$_4$

[75] Inventors: Theodorus L. Hoeks, AS Bergen op Zoom, Netherlands; Christian M. E. Bailly, Kalmthout, Belgium; Johannes H. G. M. Lohmeijer, Hoogerheide; Wilhelmus M. M. Roovers, Steenbergen, both of Netherlands

[73] Assignee: General Electric Co., Selkirk, N.Y.

[21] Appl. No.: 682,493

[22] Filed: Apr. 9, 1991

[30] Foreign Application Priority Data

Apr. 10, 1990 [NL] Netherlands ............ 9000837

[51] Int. Cl.$^5$ .............. G08K 3/30; G08L 71/12; G08L 23/20
[52] U.S. Cl. .................... 524/423; 525/132; 525/152
[58] Field of Search ............ 524/423, 497, 847; 525/132, 152

[56] References Cited

U.S. PATENT DOCUMENTS

| 4,647,613 | 3/1987 | Jadamus et al. | 524/504 |
| 4,656,220 | 4/1987 | Jadamus et al. | 524/502 |

FOREIGN PATENT DOCUMENTS

| 3518277 | 4/1986 | Fed. Rep. of Germany . |
| 185860 | 7/1986 | Fed. Rep. of Germany . |
| 205816 | 12/1986 | Fed. Rep. of Germany . |

Primary Examiner—Paul R. Michl
Assistant Examiner—Peter Szekely
Attorney, Agent, or Firm—Francis T. Coppa; Stanley Sacks

[57] ABSTRACT

The invention relates to polymer mixtures which comprise a polyphenylene ether, a polyoctenylene and TiO$_2$ or BaSO$_4$. The presence of TiO$_2$ or BaSO$_4$ leads to an improvement of the mechanical properties.

7 Claims, No Drawings

POLYMER MIXTURE WHICH COMPRISES POLYPHENYLENE ETHER, POLYOCTENYLENE AND TIO₂ OR BASO₄

The invention relates to a polymer mixture which comprises A. a polyphenylene ether and B. a polyoctenylene.

Polymer mixtures which comprise a polyphenylene ether and a polyoctenylene are known from DE-A-3518277 (U.S. Pat. No. 4,656,220). The known polymer mixtures have a favorable notched impact value, a good resistance to thermal deformability and a good processability.

It has been found that the mechanical properties of the said known polymer mixtures, in particular also the notched impact strength, can be considerably improved by the addition of $TiO_2$ or $BaSO_4$.

The polymer mixture according to the invention comprises, per 100 parts by weight of A+B, 1-60 parts by weight of $TiO_2$ or $BaSO_4$.

Due to the presence of the $TiO_2$ or $BaSO_4$ the polymer mixture according to the invention has better mechanical properties.

Improvement of the mechanical properties resulting from incorporation of $TiO_2$ or $BaSO_4$ into the polymer mixture according to the invention is surprising. Addition of $TiO_2$ and $BaSO_4$ to polymer mixtures generally leads to a deterioration of the mechanical properties, in particular of the notched impact strength.

The polymer mixture according to the invention comprises at any rate the following constituents:
A. one or more polyphenylene ethers
B. one or more polyoctenylenes, and
C. $TiO_2$ and/or $BaSO_4$.

A. Polyphenylene Ether

Polyphenylene ethers are generally known polymers. All the polyphenylene ethers known per se may be used in the polymer mixtures according to the invention. An elaborate enumeration of suitable polyphenylene ethers is to be found, for example, in WO 87/00540.

Particularly suitable are poly(2,6-dimethyl-1,4-phenylene) ether, poly(2-methyl-6-ethyl-1,4-phenylene) ether. It is also possible to use copolymers, for example, copolymers which comprise units derived from 2,3,6-trimethylphenol and from 2,6-dimethylphenol.

B. Polyoctenylene

Polyoctenylenes are known per se. For this purpose, reference may be made to DE-A-3518277 (U.S. Pat. No. 4,656,220) and to the literature mentioned therein. Polyoctenylenes are generally prepared by a polymerization reaction of cyclooctene, in which ring opening and ring expansion, respectively, may occur. All the types of polyoctenylenes mentioned in DE-A-3518277 may be used in the polymer mixture according to the invention.

C. BaSO₄ and/or TiO₂

All the conventional qualities of $BaSO_4$ and/or $TiO_2$ as they are used in polymer mixtures may be used in the polymer mixture according to the invention.

The polymer mixture according to the invention preferably comprises A. 75-99.5 parts by weight of polyphenylene ether and B. 25-0.5 parts by weight of polyoctenylene.

In addition to the constituents mentioned above the polymer mixture according to the invention may comprise conventional additives. The quantity of additives is preferably 0-50 parts by weight per 100 parts by weight of A+B. Suitable additives are, for example, agents to improve the flame retarding properties, stabilizers, pigments, dyes, agents to improve the flow properties (for example, small concentrations, i.e. not more than 10 parts by weight, of polystyrene), reinforcing fibers, for example, glass fibers or synthetic resin fibers and mold-release agents.

The polymer mixture according to the invention can be obtained according to any known technique involving preparation of polymer mixtures which comprise a polyphenylene ether. The individual constituents are preferably mixed in the melt (compounded) collectively in an extruder. The extrudate (in strand form) emanating from the extruder is then chopped up to form pellets. The pellets may be further processed, for example, in an injection molding machine.

EXAMPLES I TO VI AND COMPARATIVE EXAMPLES A AND B

Various polymer mixtures were prepared while using the following constituents:

PPE: a polyphenylene ether, namely poly(2,6-dimethyl-1,4-phenylene)ether, having an intrinsic viscosity of 40 ml/g measured in chloroform at 25° C.

PO: a polyoctenylene, namely a product which is commercially available as "VESTENAMER ®".

SEBS: a styrene-ethylene butylene-styrene triblock copolymer having a styrene content of approximately 29% and an overall molecular weight of approximately 110,000.

PE: a polyethylene, namely an LDPE having a melt index of approximately 20 g/min. measured according to ISO R 292.

RDP: tetraphenyl resorcinol diphosphate.

$H_3BO_3$: a master batch with boric acid/polystyrene/polyethylene in the ratio of 30/65/5.

$TiO_2$: conventional quality.

$BaSO_4$: conventional quality.

The various constituents were compounded in the quantities as indicated in the table below in a Werner Pfleiderer double blade extruder (adjusted at 300 (average) °C.; speed of revolution of blade: 250 rpm).

Furthermore, rods were injection-molded to determine the Izod notched impact strength. The results obtained in the measurement (room temperature) are also recorded in the table.

TABLE

| Example | A | I | II | B | III | IV | V | VI |
| --- | --- | --- | --- | --- | --- | --- | --- | --- |
| Composition (wt. parts) | | | | | | | | |
| PPE | 94.7 | 89.7 | 84.7 | 75 | 67.5 | 52.5 | 67.5 | 52.5 |
| $H_3BO_3$ | — | — | — | 7 | 6.3 | 4.9 | 6.3 | 4.9 |
| PO | 2.8 | 2.8 | 2.8 | 4.5 | 4.1 | 3.2 | 4.1 | 3.2 |
| RDP | — | — | — | 13.5 | 12.1 | 9.4 | 12.1 | 9.4 |
| PE | 1 | 1 | 1 | — | — | — | — | — |
| SEBS | 1.5 | 1.5 | 1.5 | — | — | — | — | — |
| $TiO_2$ | — | 5 | 10 | — | 10 | 30 | | |
| $BaSO_4$ | — | — | — | — | — | — | 10 | 30 |
| Properties | | | | | | | | |
| Izod notched Impact (J/m) | 264 | 298 | 324 | 194 | 391 | 133 | 345 | 48 |

It may be seen from the table that the addition of $TiO_2$ or $BaSO_4$ to polymer mixtures which comprise a polyphenylene ether and a polyoctenylene leads to an increase of the notched impact strength. This applies in particular to $TiO_2$. The addition of quantities of $BaSO_4$ (example VI) above a certain level or $TiO_2$ (example IV) leads to a decrease. Based on the recorded results (examples III and IV on the one hand and V and VI on the other hand) there exists an optimum for the quantity of $TiO_2$ or $BaSO_4$ added. It is therefore recommended to add not more than 20 parts by weight of $TiO_2$ or $BaSO_4$ per 100 parts by weight of polyphenylene plus polyoctenylene.

All patent (applications) mentioned herein are herewith incorporated by reference.

We claim:

1. A polymer mixture, comprising:
   A) polyphenylene ether resin;
   B) polyoctenylene resin; and
   C) $BaSO_4$, in an amount effective to increase the notched impact value of the polymer mixture.

2. A polymer mixture as claimed in claim 1, characterised in that the polymer mixture comprises A. 75-99.5% by weight of polyphenylene ether and B. 25-0.5% by weight of polyoctenylene, calculated with respect to the sum of the parts by weight of A+B.

3. The polymer mixture of claim 1, comprising 1-60 parts by weight of $BaSO_4$ per 100 parts by weight of A+B.

4. The polymer mixture of claim 1, comprising 0-50 parts by weight, per 100 parts by weight of A+B, of at least one additive selected from the group consisting of flame retardants, stabilizers, pigments, dyes, flow-improving agents, reinforcing fibers, and mold-release agents.

5. An article formed from the mixture of claim 1.

6. A method of improving notched impact values of a polymer mixture comprising polyphenylene ether and polyoctenylene,
   said method comprising adding $BaSO_4$ to said polymer mixture in an amount effective to increase notched impact value.

7. A method in accordance with the method of claim 6, wherein the amount of $BaSO_4$ is 1-60 parts by weight per 100 parts by weight of said polyphenylene ether+-said polyoctenylene.

* * * * *